(12) United States Patent
Ramani et al.

(10) Patent No.: US 11,983,083 B2
(45) Date of Patent: May 14, 2024

(54) TRUST RELATIONSHIP MIGRATION FOR DATA MIRRORING

(71) Applicant: NetApp Inc., San Jose, CA (US)

(72) Inventors: Balaji Ramani, Bangalore (IN);
Harsha Sridhara, Bangalore (IN);
Rakshit Karnawat, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/744,875

(22) Filed: May 16, 2022

(65) Prior Publication Data
US 2022/0276941 A1   Sep. 1, 2022

Related U.S. Application Data

(63) Continuation of application No. 16/806,031, filed on Mar. 2, 2020, now Pat. No. 11,334,454, which is a
(Continued)

(51) Int. Cl.
| | |
|---|---|
| *G06F 11/00* | (2006.01) |
| *G06F 3/06* | (2006.01) |
| *G06F 11/20* | (2006.01) |
| *G06F 21/00* | (2013.01) |
| *G06F 21/53* | (2013.01) |

(Continued)

(52) U.S. Cl.
CPC ........ *G06F 11/2069* (2013.01); *G06F 3/0619* (2013.01); *G06F 3/0647* (2013.01); *G06F 3/065* (2013.01); *G06F 3/0683* (2013.01); *G06F 11/2071* (2013.01); *G06F 11/2094* (2013.01); *G06F 21/00* (2013.01); *G06F 21/53* (2013.01); *G06F 21/57* (2013.01); *G06F 11/1456* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 7,603,581 | B2 | 10/2009 | Boyd et al. |
| 8,495,319 | B2 | 7/2013 | Suishu et al. |

(Continued)

OTHER PUBLICATIONS

Google Scholar/Patents search—text refined (Year: 2023).*
Google Scholar/Patents., "Virtual Machine Node Trust Relationship Storage," Text Refined, 2021, 11 pages.

*Primary Examiner* — Christopher S McCarthy
(74) *Attorney, Agent, or Firm* — Cooper Legal Group, LLC

(57) ABSTRACT

One or more techniques and/or systems are provided for migrating a trust relationship. For example, a first storage cluster and a second storage cluster have a disaster recovery relationship where the second storage cluster provides failover client access to replicated data, replicated from the first storage cluster to the second storage cluster, in the event the first storage cluster fails. The first storage cluster may have a trust relationship with a third storage cluster, such that data is mirrored from a volume of the first storage cluster into a mirrored volume of the third storage cluster based upon the trust relationship. In the event the first storage cluster fails over to the second storage cluster due to a disaster at the first storage cluster, the trust relationship is migrated to be between the second storage cluster and the third storage cluster for non-disruptive mirroring of data to the mirrored volume.

20 Claims, 8 Drawing Sheets

Related U.S. Application Data continuation of application No. 15/820,940, filed on Nov. 22, 2017, now Pat. No. 10,621,056, which is a continuation of application No. 14/838,678, filed on Aug. 28, 2015, now Pat. No. 9,836,367.

(51) Int. Cl.
*G06F 21/57* (2013.01)
*G06F 11/14* (2006.01)

(56) References Cited

U.S. PATENT DOCUMENTS

| | | |
|---|---|---|
| 8,788,772 B2 | 7/2014 | Clayton et al. |
| 9,836,367 B2 | 12/2017 | Ramani et al. |
| 9,940,154 B2 | 4/2018 | Ramani et al. |
| 10,621,056 B2 | 4/2020 | Ramani et al. |
| 11,334,454 B2 | 5/2022 | Ramani et al. |
| 2005/0038968 A1 | 2/2005 | Iwamura et al. |
| 2005/0081091 A1 | 4/2005 | Bartfai et al. |
| 2007/0079126 A1 | 4/2007 | Hsu et al. |
| 2007/0260717 A1 | 11/2007 | Kano |
| 2008/0172572 A1 | 7/2008 | Beardsley et al. |
| 2009/0271658 A1 | 10/2009 | Aidun |
| 2009/0271685 A1 | 10/2009 | Li et al. |
| 2012/0233463 A1 | 9/2012 | Holt et al. |
| 2015/0095692 A1 | 4/2015 | Thiele et al. |
| 2015/0363276 A1 | 12/2015 | Banerjee et al. |
| 2021/0173945 A1 | 6/2021 | Karr et al. |

* cited by examiner

TRUST RELATIONSHIP MIGRATION FOR DATA MIRRORING

RELATED APPLICATION

This application claims priority to and is a continuation of U.S. patent application Ser. No. 16/806,031, filed on Mar. 2, 2020 and titled "TRUST RELATIONSHIP MIGRATION FOR DATA MIRRORING," which claims priority to and is a continuation of U.S. Pat. No. 10,621,056, filed on Nov. 22, 2017 and titled "TRUST RELATIONSHIP MIGRATION FOR DATA MIRRORING," which claims priority to and is a continuation of U.S. Pat. No. 9,836,367, filed on Aug. 28, 2015 and titled "TRUST RELATIONSHIP MIGRATION FOR DATA MIRRORING," which are incorporated herein by reference.

BACKGROUND

A storage network environment may comprise one or more storage clusters of storage controllers (e.g., nodes) configured to provide clients with access to user data stored within storage devices. For example, a first storage cluster may comprise a first storage controller configured to provide clients with access to user data stored within a first storage device. A second storage cluster may be configured according to a disaster recovery relationship with respect to the first storage cluster, such that user data (e.g., user files, applications, etc.) and configuration data (e.g., volume information, a replication policy, a network interface configuration, etc.) are replicated from the first storage cluster to the second storage cluster. In this way, when a disaster occurs at the first storage cluster and clients are unable to access user data within the first storage device because the first storage controller may be unavailable or may have failed from the disaster, a second storage controller of the second storage cluster may provide clients with failover client access to replicated user data that was replicated from the first storage device to a second storage device accessible to the second storage controller. When the first storage cluster recovers from the disaster, the second storage cluster may switch back to the first storage cluster such that the first storage controller provides clients with access to user data from the first storage device (e.g., the first storage device may be synchronized with any changes made to user data and/or configuration data within the second storage device during switchover operation by the second storage controller). In this way, user data and configuration data may be backed up between storage clusters for disaster recovery.

Because a client may be unable to access the replicated user data on the second storage cluster due to the disaster recovery relationship (e.g., client access to the second storage device may be restricted because the second storage device is a backup storage device for disaster recovery), the client may request a trust relationship between the first storage cluster and a third storage cluster where the trust relationship specifies that data from the first storage cluster can be mirrored to the third storage cluster for client backup and/or access by the client. In an example, the trust relationship may be established based upon storage administrators of the first storage cluster and the third storage cluster coming to an agreement regarding the mirroring of data (e.g., an agreement that a volume of a virtual storage machine of the first storage cluster can mirror data to a mirrored volume of a second virtual storage machine of the third storage cluster). Unfortunately, if the first storage cluster experiences a disaster and the second storage cluster takes over for the first storage cluster using a switchover operation, the trust relationship is broken and an interruption in mirroring of data to the third storage cluster will occur until a new trust relationship is manually established by the client between storage administrators of the second storage cluster and the third storage cluster (e.g., if the client is unaware of the broken trust relationship, then the client may inadvertently forgo setting up the new trust relationship, thus losing any mirroring of data to the third storage cluster).

DETAILED DESCRIPTION

Figure 1:
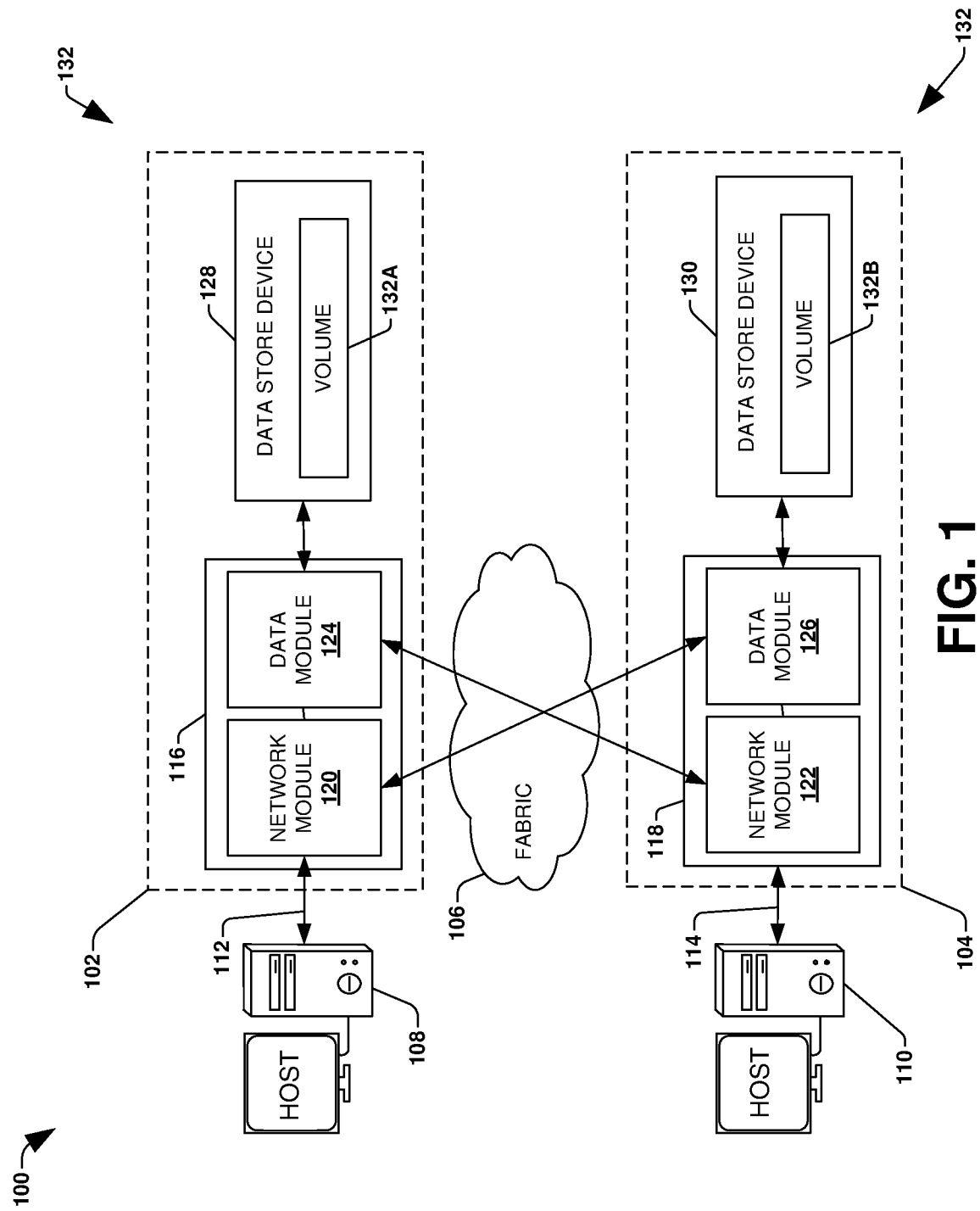
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for migrating a trust relationship are provided. A first storage cluster and a second storage cluster may be configured according to a data protection relationship (e.g., replication of data from a storage cluster to another storage cluster for data replication and redundancy) and/or a disaster recovery relationship (e.g., when a storage cluster fails, a switchover to another storage cluster is performed for failover client access to replicated data), such that the user data and configuration data of the first storage cluster may be replicated from the first storage cluster to the second storage cluster so that the second storage cluster may provide failover client access to replicated user data in the event a disaster occurs at the first storage cluster. Similarly, user data and configuration data of the second storage cluster may be replicated from the second storage cluster to the first storage cluster so that the first storage cluster may provide failover access to replicated user data in the event a disaster occurs at the second storage cluster.

Because a client may be unable to access replicated user data, the client may establish a mirroring relationship between the first storage cluster and a third storage cluster for mirroring data, such as mirroring data from a volume of the first storage cluster to a mirrored volume within the third storage cluster. Unfortunately, if the first storage cluster fails and a switchover operation to the second storage cluster is performed, then the trust relationship is broken and data mirroring to the third storage cluster is lost until a new trust relationship is manually created. Accordingly, as provided herein, the trust relationship may be automatically migrated (e.g., automatic triggering based upon a disaster of the first storage cluster and/or based upon the switchover operation) so that data (e.g., replicated data) is mirrored from the second storage cluster to the third storage cluster. In this way, non-disruptive data mirroring, such as volume level data mirroring, of data to the third storage cluster may be maintained based upon the trust relationship and the migrated trust relationship.

To provide context for trust relationship migration, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that trust relationship migration may be implemented within the clustered network environment 100. For example, a relationship migration component may be implemented for the node 116 and/or the node 118. The relationship migration component may be configured to migrate a trust relationship between the node 116 and the node 118 (e.g., data may be mirrored from the node 116 to the node 118 based upon the trust relationship) to another node. For example, responsive to the node 116 having a disaster and switching over to a second node with which the node 116 has a disaster recovery relationship, the trust relationship may be migrated as a migrated trust relationship between the second node and the node 118 for data mirroring.

Figure 2:
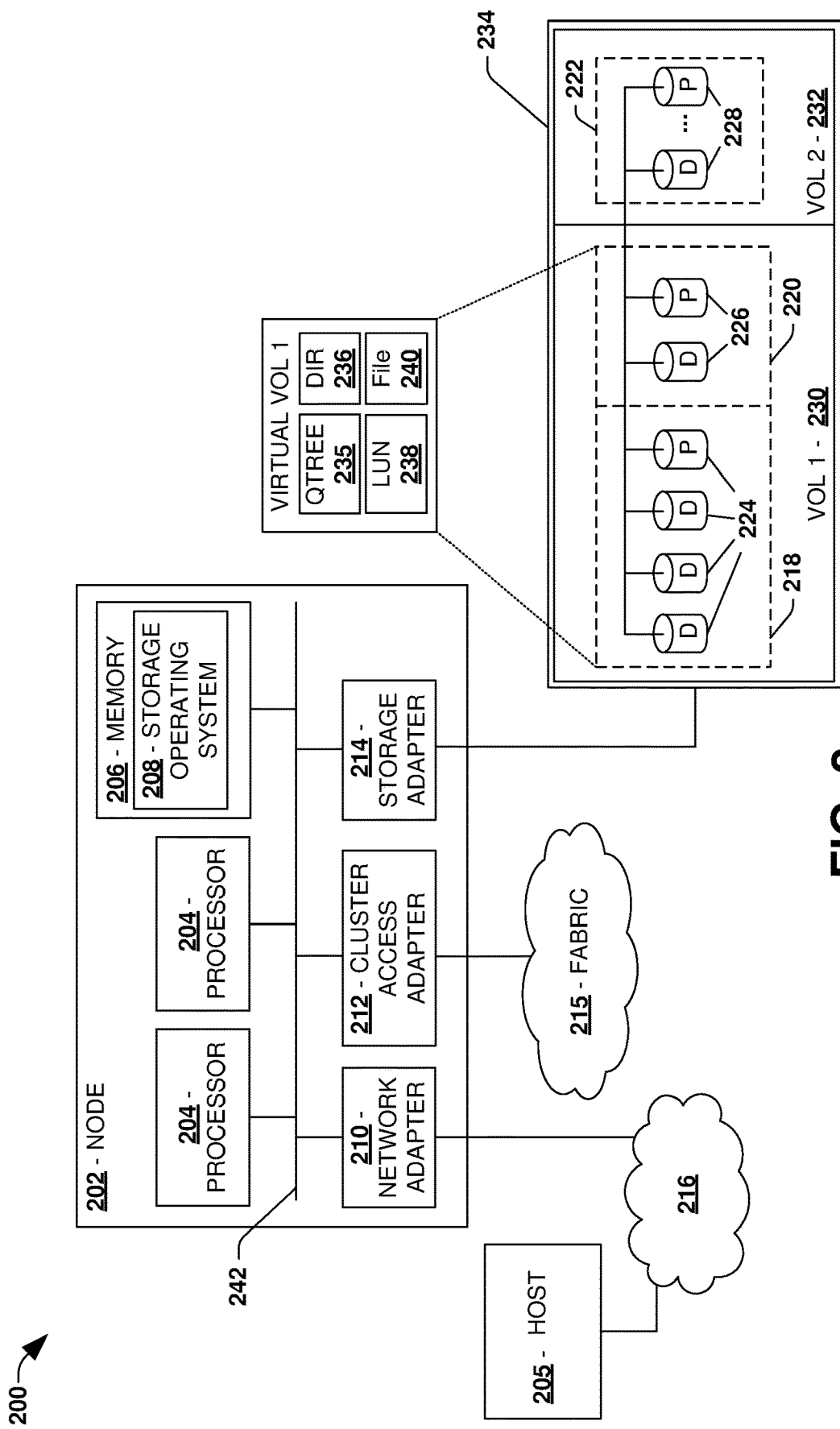
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that trust relationship migration may be implemented for the data storage system 200. For example, a trust relationship component may be implemented for the node 202. The relationship migration component may be configured to migrate a trust relationship between the node 202 and a second node (e.g., data may be mirrored from the node 202 to the second node based upon the trust relationship) to another node. For example, responsive to the node 202 having a disaster and switching over to a third node with which the node 202 has a disaster recovery relationship, the trust relationship may be migrated as a migrated trust relationship between the third node and the second node for data mirroring.

Figure 3:
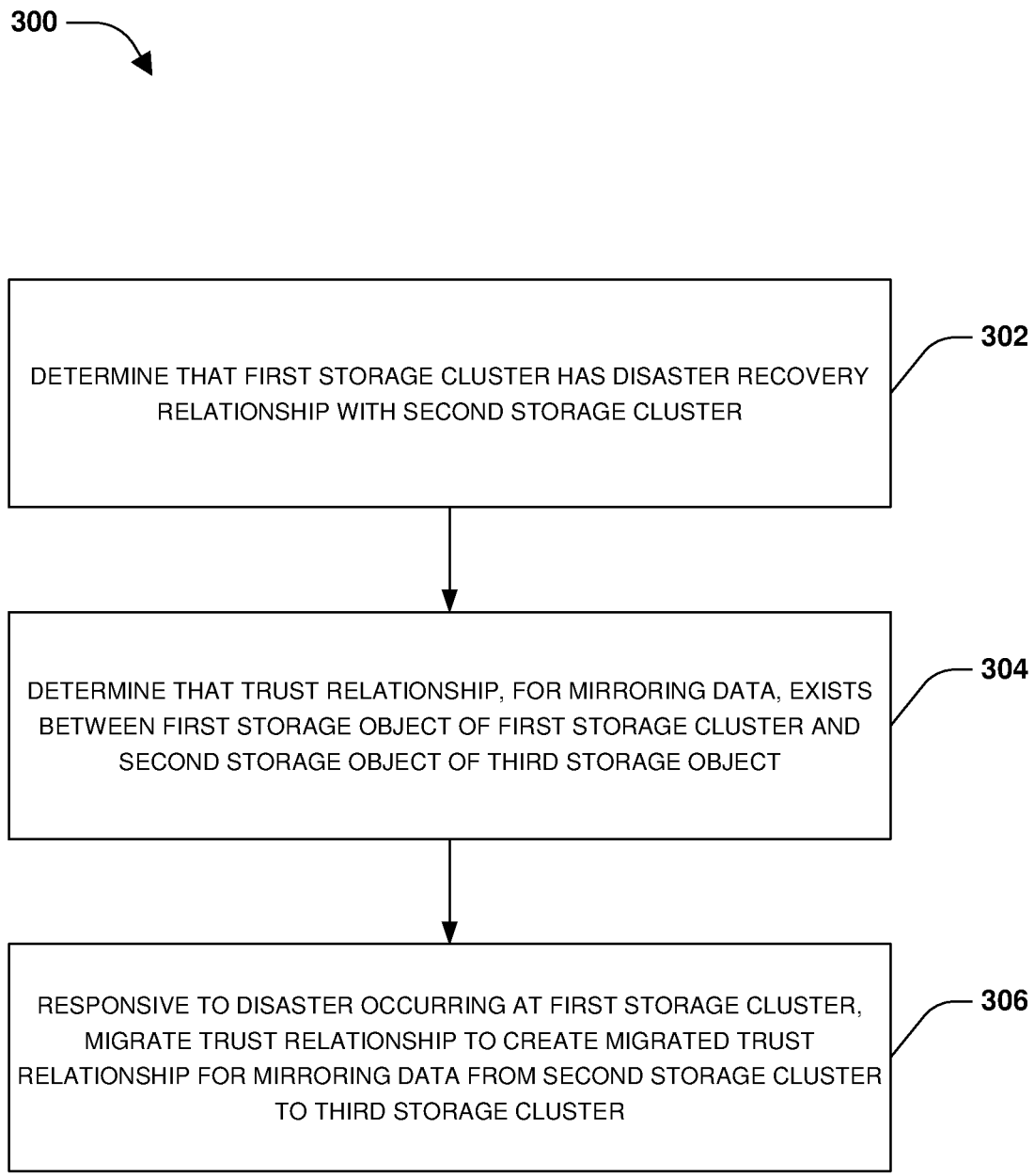
FIG. 3 is a flow chart illustrating an exemplary method of migrating a trust relationship.

One embodiment of migrating a trust relationship is illustrated by an exemplary method 300 of FIG. 3. At 302, a first storage cluster and a second storage cluster may be determined as having a disaster recovery relationship where user data and configuration data (e.g., volume information, LUN information, snapshot policy information, network interface information, routing route information, IP information, etc.) is synchronously or asynchronously replicated from the first storage cluster to the second storage cluster. For example, a first storage controller of the first storage cluster may provide primary client access to user data stored within a first storage object (e.g., a first storage virtual machine comprising a volume) comprised within the first storage cluster. The user data and configuration data of the first storage object may be replicated to the second storage cluster, such as into a second storage object having a disaster recovery backup relationship with the first storage object (e.g., into a replicated volume, of a second storage virtual machine comprised within the second storage object, that is a disaster recovery backup of the volume), so that a second storage controller may provide failover client access to replicated user data within the second storage object in the event a disaster occurs at the first storage cluster.

Responsive to the first storage cluster recovering from the disaster, the second storage cluster may switch back control to the first storage cluster for providing primary client access to user data from the first storage object (e.g., the first storage object may be synchronized with any changes made to user data and/or configuration data within the second storage object). Because the second storage object has the disaster recovery backup relationship with the first storage object, a client may be unable to access the second storage object (e.g., the client may be restricted from accessing the replicated volume within the second storage cluster).

At 304, a trust relationship, for mirroring data from the first storage cluster to a third storage cluster, may be determined to exist between the first storage object of the first storage cluster (e.g., the first storage virtual machine such as the volume) and a third storage object of the third storage cluster (e.g., a third storage virtual machine comprising a mirrored volume that is a mirror of the volume). For example, the trust relationship may specify that data of the volume of the first storage virtual machine within the first storage cluster is to be mirrored into the mirrored volume of the third storage virtual machine within the third storage cluster. In an example, the first storage cluster and the third storage cluster have a non-disaster recovery relationship, such that a client may be provided with access to the third storage object, such as the mirrored volume (e.g., read access, modify access, mount access, or any other volume operation access to the mirrored volume). In this way, the trust relationship may specify that the first storage cluster is the data mirroring source for the third storage cluster.

At 306, responsive to determining that the second storage cluster is providing failover client access, based upon the disaster recovery relationship, to data (e.g., replicated data within the replicated volume) in place of the first storage cluster due to the first storage cluster having a disaster, the trust relationship may be migrated from between the first storage cluster and the third storage cluster to being between the second storage cluster and the third storage cluster to create a migrated trust relationship for mirroring data from the second storage cluster to the third storage cluster (e.g., migrating data from the replicated volume of the second storage cluster to the mirrored volume of the third storage cluster). The migrated trust relationship may specify that data of the second storage object within the second storage cluster (e.g., data within the replicated volume because the replicated volume is a disaster recovery backup of the volume within the first storage cluster) is to be mirrored to the third storage object, such as the mirrored volume, of the third storage cluster. In this way, the migrated trust relationship may specify that the second storage cluster is the data mirroring source for the third storage cluster. In an example, the migration may be automatically triggered based upon a trigger event such as based upon detection of the first storage cluster experiencing the disaster and/or based upon detection that the second storage cluster is providing failover client access to data in place of the first storage cluster.

In an example, the first storage cluster may recover from the disaster, and the second storage cluster may switch back to the first storage cluster such that the first storage cluster is providing primary client access to data, such as data within the volume of the first storage virtual machine (e.g., the volume may be synchronized with any changes to user data and/or configuration data within the replicated volume during switchover operation). Responsive to identifying the switchback, the migrated trust relationship may be migrated back from between the second storage cluster and the third storage cluster to being between the first storage cluster and the third storage cluster to create a restored trust relationship for mirroring data from the first storage cluster to the third storage cluster. In this way, non-disruptive volume level data mirroring of data to the third storage cluster, such as the mirrored volume, may be maintained based up the trust relationship, the migrated trust relationship, and/or the restored trust relationship.

Figure 4A:
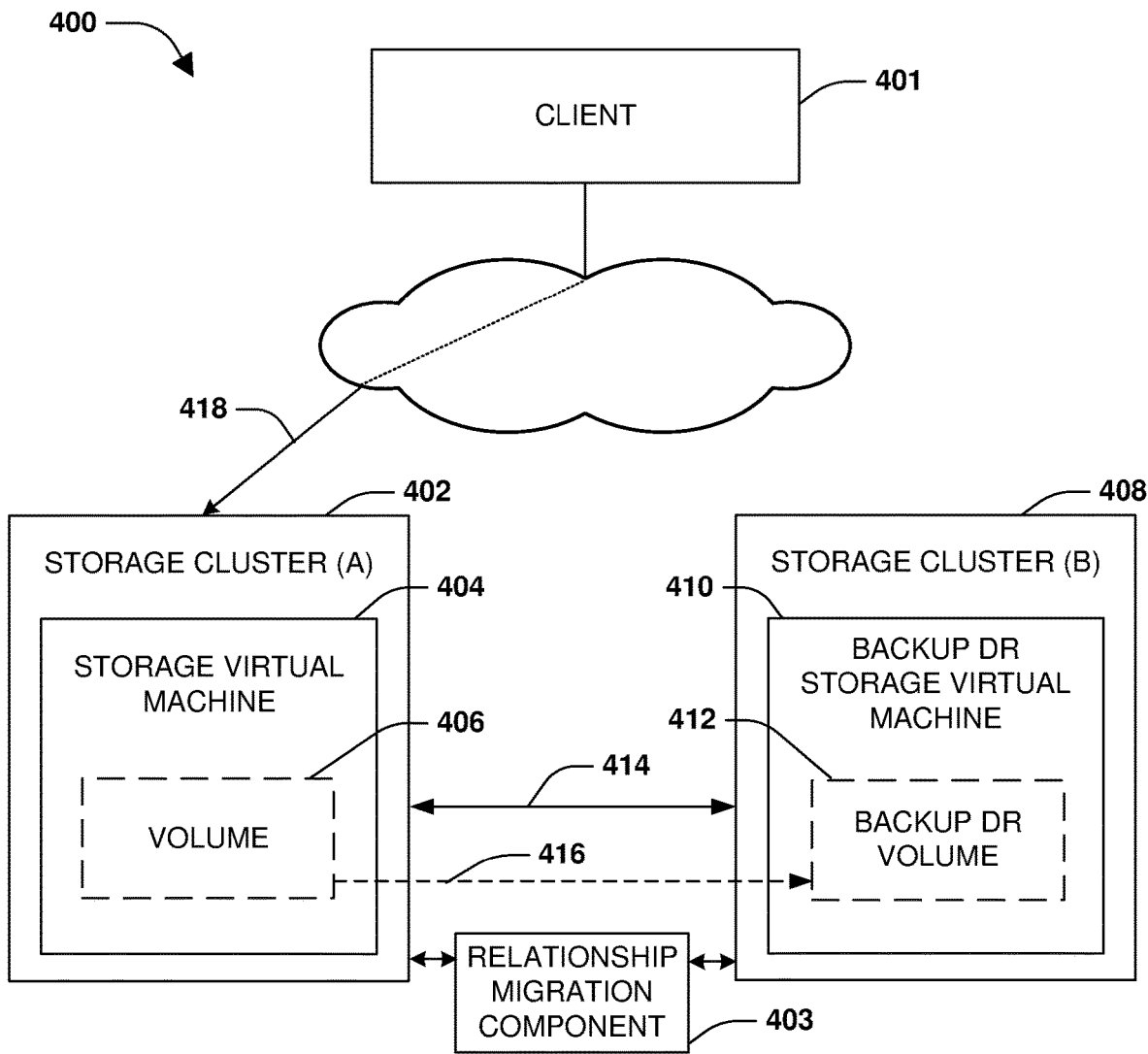
FIG. 4A is a component block diagram illustrating an exemplary system for migrating a trust relationship, where a disaster recovery relationship is established between a first storage cluster and a second storage cluster.

FIGS. 4A-4D illustrate examples of a system 400, comprising a relationship migration component 401, for migrating a trust relationship. FIG. 4A illustrates a storage cluster (A) 402 and a storage cluster (B) 408 having data protection relationship 414 (e.g., indicating that data is to be replicated from the storage cluster (A) 402 to the storage cluster (B) 408 for backup data protection) and/or a disaster recovery relationship 416 (e.g., indicating that the storage cluster (B) 408 is to provide failover client access to data in place of the storage cluster (A) 402 in the event the storage cluster (A) 402 experiences a disaster), where changes to user data and configuration data managed by the storage cluster (A) 402 are backed up to the second storage cluster (B) 408, and changes to user data and configuration data managed by the storage cluster (B) 408 are backed up to the storage cluster (A) 402. For example, the storage cluster (A) 402 may comprise a storage virtual machine 404 comprising a volume 406. The storage cluster (A) 402 may provide a client 401 with access 418 to the volume 406 (e.g., the client 401 may store, retrieve, and/or modify database files, application data, and/or other user files within the volume 406).

Because of the data protection relationship 414 and/or the disaster recovery relationship 416, a backup disaster recovery storage virtual machine 410 may be maintained by the storage cluster (B) 408 as a backup for the volume 406 in the event a disaster occurs at the storage cluster (A) 402. The backup disaster recovery storage virtual machine 410 may comprise a backup disaster recovery volume 412 into which data of the volume 406 is replicated to create replicated backup data. In this way, user data and/or configuration data of the volume 406 is replicated into the backup disaster recovery volume 412 so that the storage cluster (B) 408 may provide the client 401 with failover access to replicated backup data within the backup disaster recovery volume 412 in the event the storage cluster (A) 402 fails and the client 401 is unable to access the volume 406.

Figure 4B:
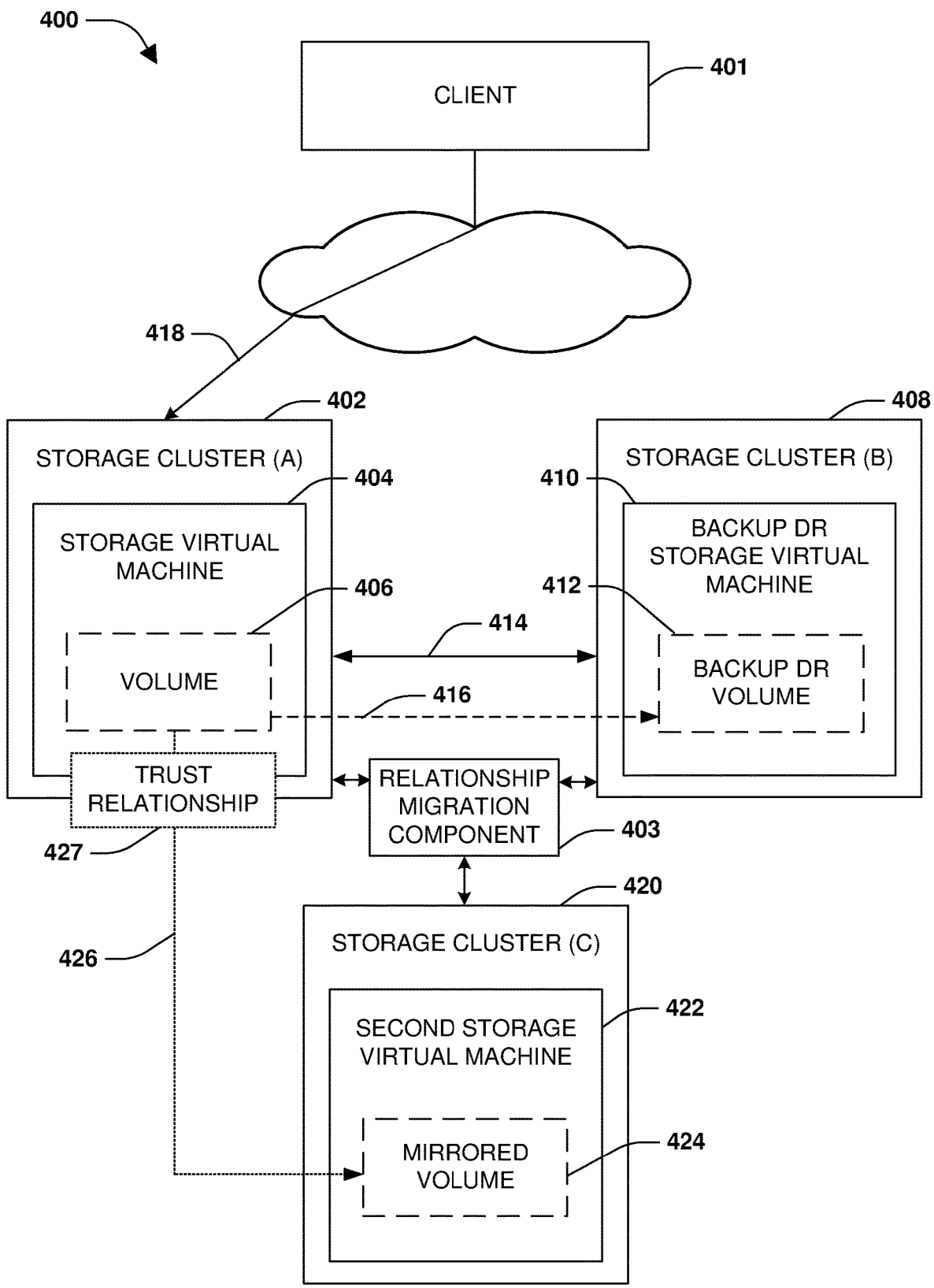
FIG. 4B is a component block diagram illustrating an exemplary system for migrating a trust relationship, where a trust relationship, for mirroring data, is established between a first storage cluster and a third storage cluster.

FIG. 4B illustrates an example of the relationship migration component 403 identifying a trust relationship 427. For example, the client 401 may request for the trust relationship 427 to be established between the storage virtual machine 404 and a second storage virtual machine 422 hosted on a storage cluster (C) 420 (e.g., a storage cluster with which the storage cluster (A) 402 does not have a disaster recovery relationship). In an example, the trust relationship 427 may be agreed upon by storage administrators of the storage cluster (A) 402 and the storage cluster (C) 420 so that data of the volume 406 can be mirrored 426 into a mirrored volume 424 within the second storage virtual machine 422. In this way, the client 401 may access the mirrored volume 424 for reading, modifying, mounting, and/or performing other volume level operations because the client 401 may otherwise not have such access to the backup disaster recovery volume 412 within the storage cluster (B) 408 due to the disaster recovery relationship 416.

Figure 4C:
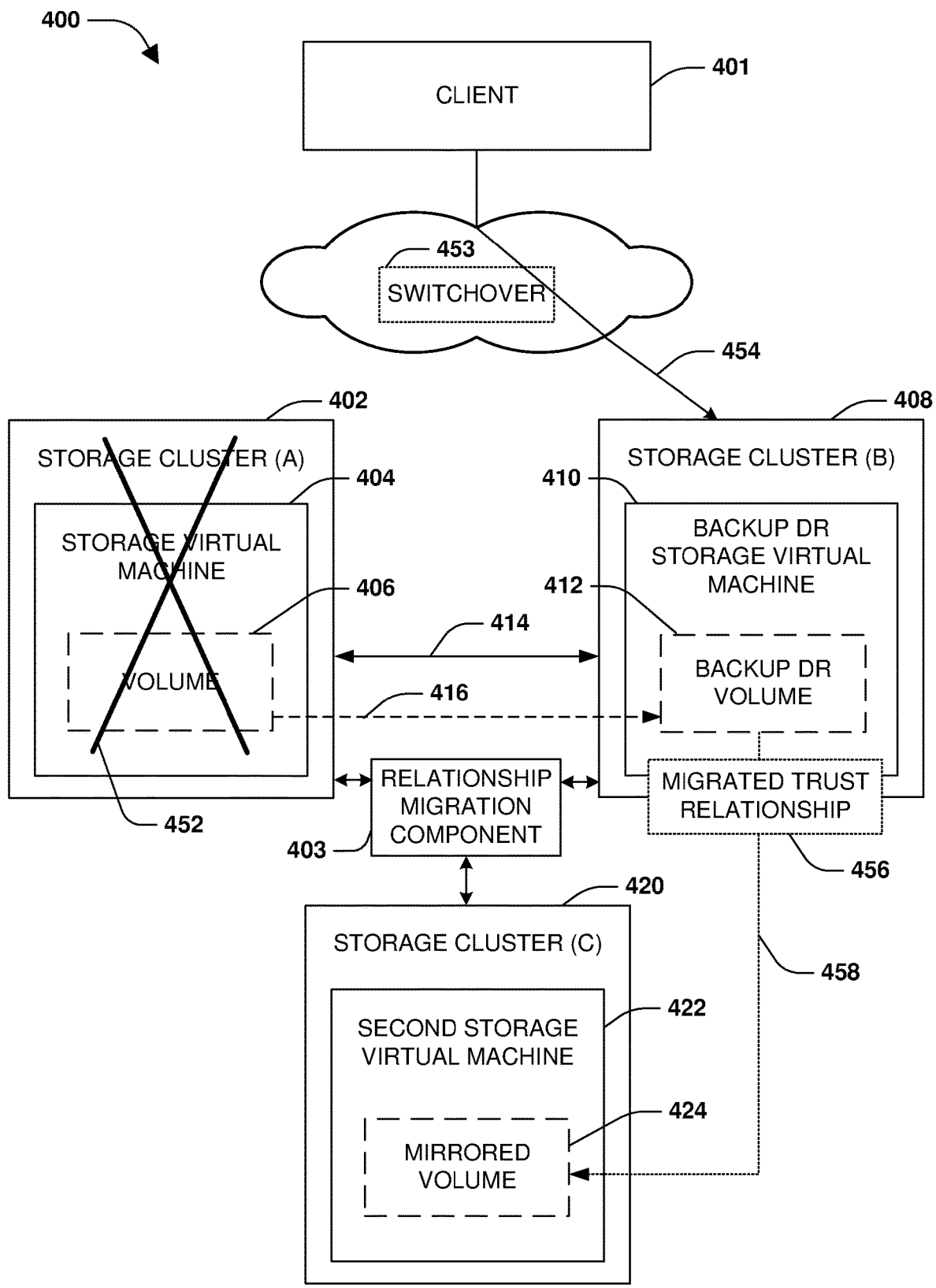
FIG. 4C is a component block diagram illustrating an exemplary system for migrating a trust relationship, where a trust relationship is migrated to create a migrated trust relationship based upon a switchover operation.

FIG. 4C illustrates an example of the relationship migration component 403 triggering migration of the trust relationship 427 based upon a switchover 453 from the storage cluster (A) 402 to the storage cluster (B) 408. For example, a disaster 452 may occur at the storage cluster (A) 402, such that the client 401 is unable to access the volume 406 through the storage cluster (A) 402. In response to the disaster 452, the switchover 453 may be performed where the storage cluster (B) 408 provides the client 401 with access 454 to replicated data, replicated from the volume 406 to the backup disaster recovery volume 412, within the backup disaster recovery volume 412 in place of the storage cluster (A) 402 based upon the disaster recovery relationship 416.

Accordingly, the relationship migration component 403 may migrate the trust relationship 427 from being between the storage cluster (A) 402 and the storage cluster (C) 420 to being between the storage cluster (B) 408 and the storage cluster (C) 420 to create a migrated trust relationship 456. The migrated trust relationship 456 may specify that the storage cluster (B) 408 is a mirroring source for mirroring data from the backup disaster recovery volume 412 to the mirrored volume 424 (e.g., the migrated trust relationship 456 replaces the trust relationship 427, lost due to the disaster 452, that specified that the storage cluster (A) 402 was the mirroring source for mirroring data from the volume 406 to the mirrored volume 424). Because the backup disaster recovery volume 412 comprises replicated data of the volume 406 and is now servicing the client 401 for accessing 454 the replicated data of the backup disaster recovery volume 412, up-to-date data may be mirrored from the backup disaster recovery volume 412 into the mirrored volume 424 based upon the migrated trust relationship 456. In this way, non-disruptive volume level data mirroring of data to the storage cluster (C) 420, such as into the mirrored volume 424, may be maintained based upon the relationship migration component 403 automatically migrating the trust relationship 427 to create the migrated trust relationship 456, which may mitigate data loss otherwise occurring if the trust relationship 456 was not automatically created from the migration because mirroring of data would otherwise have stopped until a new trust relationship was manually recreated.

Figure 4D:
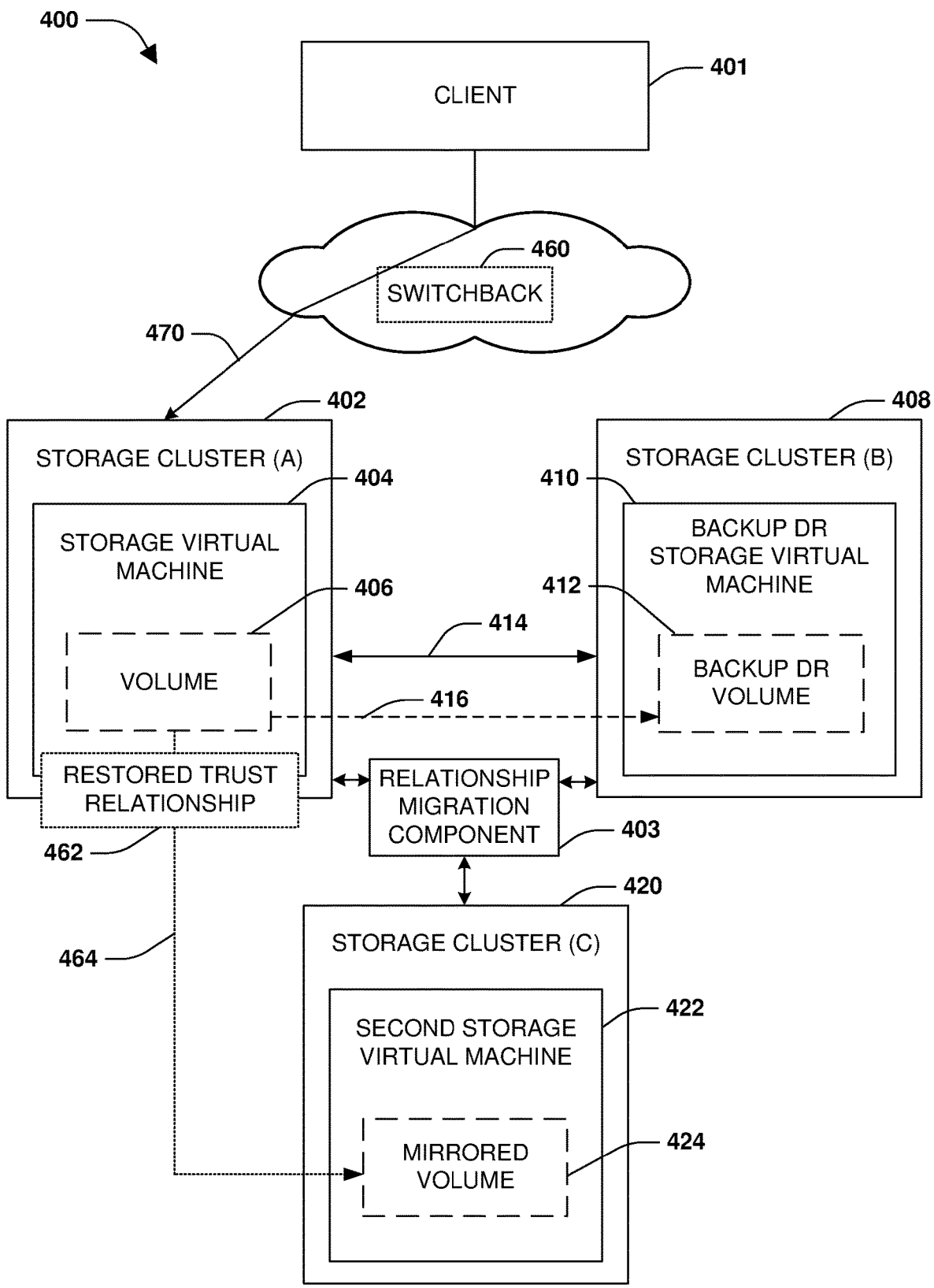
FIG. 4D is a component block diagram illustrating an exemplary system for migrating a trust relationship, where a migrated trust relationship is migrated to create a restored trust relationship based upon a switchback operation.

FIG. 4D illustrates an example of a switchback operation 460 being performed based upon restoration of the storage cluster (A) 402 into an operational state. For example, the storage cluster (A) 402 may recover from the disaster 452 such that the storage virtual machine 404 and the volume 406 may be made accessible 470 to the client 401 based upon the switchback operation 460 (e.g., the volume 406 may be synchronized with the backup disaster recovery volume 412 so that the volume 406 reflects data changes made to the backup disaster recovery volume 412 while the storage cluster (A) 402 was inoperable).

Accordingly, the relationship migration component 403 may migrate the migrated trust relationship 456 from between the storage cluster (B) 408 and the storage cluster (C) 420 to being between the storage cluster (A) 402 and the storage cluster (C) 420 to create a restored trust relationship 462. The restored trust relationship 462 may specify that the storage cluster (A) 402 is the mirroring source for mirroring data from the volume 406 to the mirrored volume 424. In this way, non-disruptive volume level data mirroring of data to the storage cluster (C) 420, such as into the mirrored volume 424, may be maintained based upon the relationship migration component 403 automatically migrating the migrated trust relationship 456 to create the restored trust relationship 462, which may mitigate data loss otherwise occurring if the restored trust relationship 462 was not automatically created from the migration because mirroring of new data changes to the volume 406 would not otherwise be mirrored to the mirrored volume 424 until a new trust relationship was manually recreated.

Figure 5:
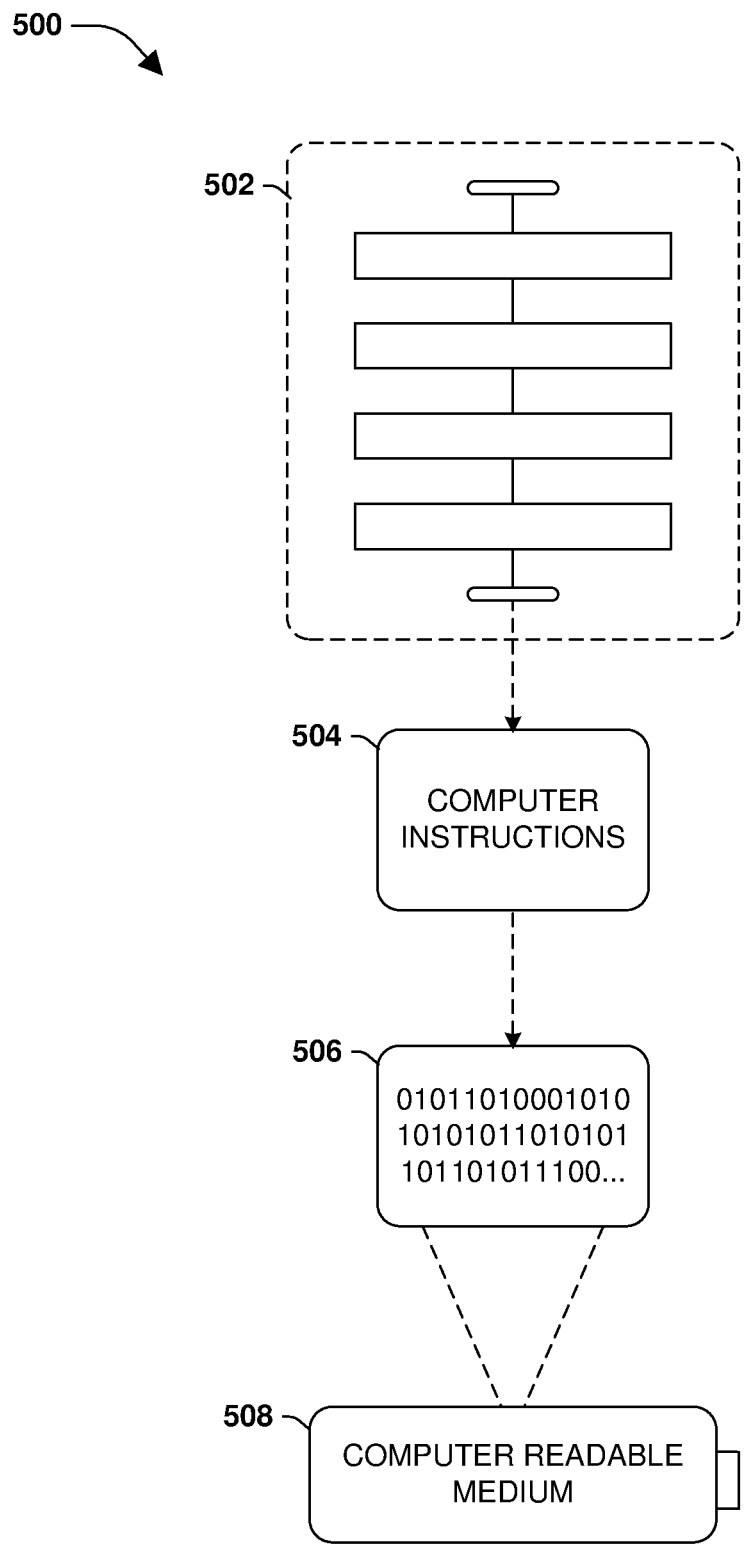
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 400 of FIGS. 4A-4D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    establishing a disaster recovery relationship and a trust relationship between a first cluster and a second cluster, wherein the trust relationship allows the first cluster to mirror data, remotely written by a client to the first cluster, to the second cluster, wherein the trust relationship is further established to enable the client to remotely access the mirrored data from the second cluster, and wherein the client is restricted from accessing the mirrored data before establishment of the trust relationship;
    monitoring the first cluster for a disaster;
    in response to detecting the disaster of the first cluster, performing a failover from the first cluster to the second cluster based upon the disaster recovery relationship, wherein the failover breaks the trust relationship, wherein no trust relationship is established between the second cluster and a different cluster than the first cluster prior to the disaster of the first cluster, wherein the client is remote to the different cluster; and providing, by the second cluster during the failover, the client with remote access to data previously accessible to the client through the first cluster before the disaster, wherein the trust relationship is automatically migrated to create a migrated trust relationship, created in response to initiation of the failover triggered based upon detecting the disaster of the first cluster, for allowing mirroring of data from the second cluster to the different cluster.

2. The method of claim 1, comprising:
detecting that the first cluster recovered from the disaster; and
performing a switchback from the second cluster to the first cluster, wherein the first cluster provides the clients with access to the data previously accessible to the clients through the second cluster during the failover.

3. The method of claim 1, comprising:
establishing a data protection relationship between the first cluster and the second cluster; and
mirroring data from the first cluster to the second cluster based upon the data protection relationship.

4. The method of claim 1, comprising:
restricting the client from access to a replicated volume, the replicated volume storing the mirrored data, at the second cluster before establishment of the trust relationship.

5. The method of claim 1, comprising:
performing volume level data mirroring from the first cluster to the second cluster.

6. The method of claim 1, wherein the different cluster is a third cluster different than the first cluster and the second cluster.

7. The method of claim 1, wherein the providing comprises:
providing the clients with access to the data within a backup disaster recovery volume into which the data was replicated from a volume maintained by the first cluster.

8. The method of claim 1, comprising:
automatically creating a restored trust relationship to replace the trust relationship broken by the failover.

9. A computing device, comprising:
a processor; and
a memory containing instructions, which when executed by the processor, cause the processor to:
establish disaster recovery relationship and a trust relationship between a first cluster and a second cluster, wherein the trust relationship allows the first cluster to mirror data, remotely written by a client to the first cluster, to the second cluster, wherein the trust relationship is further established to enable the client to remotely access the mirrored data from the second cluster, and wherein the client is restricted from accessing the mirrored data before establishment of the trust relationship;
monitor the first cluster for a disaster, wherein no trust relationship is established between the second cluster and a different cluster than the first cluster prior to the disaster of the first cluster, wherein the client is remote to the different cluster;
in response to detecting the disaster of the first cluster, perform a failover from the first cluster to the second cluster based upon the disaster recovery relationship, wherein the failover breaks the trust relationship; and
provide, by the second cluster during the failover, the client with remote access to data previously accessible to the client through the first cluster before the disaster, wherein the trust relationship is automatically migrated to create a migrated trust relationship, created in response to initiation of the failover triggered based upon detecting the disaster of the first cluster, for allowing mirroring of data from the second cluster to the different cluster.

10. The computing device of claim 9, wherein the instructions cause the processor to:
detect that the first cluster recovered from the disaster; and
perform a switchback from the second cluster to the first cluster, wherein the first cluster provides the clients with access to the data previously accessible to the clients through the second cluster during the failover.

11. The computing device of claim 9, wherein the instructions cause the processor to:
establish a data protection relationship between the first cluster and the second cluster; and
mirror data from the first cluster to the second cluster based upon the data protection relationship.

12. The computing device of claim 9, wherein the instructions cause the processor to:
restrict the client from access to a replicated volume, the replicated volume storing the mirrored data, at the second cluster before establishment of the trust relationship.

13. The computing device of claim 9, wherein the instructions cause the processor to:
perform volume level data mirroring from the first cluster to the second cluster.

14. The computing device of claim 9, the different cluster is a third cluster different than the first cluster and the second cluster.

15. The computing device of claim 9, wherein the instructions cause the processor to:
provide the clients with access to the data within a backup disaster recovery volume into which the data was replicated from a volume maintained by the first cluster.

16. The computing device of claim 9, wherein the instructions cause the processor to:
automatically create a restored trust relationship to replace the trust relationship broken by the failover.

17. A non-transitory machine readable medium comprising instructions for performing a method, which when executed by a machine, causes the machine to:
establish disaster recovery relationship and a trust relationship between a first cluster and a second cluster, wherein the trust relationship allows the first cluster to mirror data, remotely written by a client to the first cluster, to the second cluster, wherein the trust relationship is further established to enable the client to remotely access the mirrored data from the second cluster, and wherein the client is restricted from accessing the mirrored data before establishment of the trust relationship;
monitor the first cluster for a disaster, wherein no trust relationship is established between the second cluster and a different cluster than the first cluster prior to the disaster of the first cluster, wherein the client is remote to the different cluster;
in response to detecting the disaster of the first cluster, perform a failover from the first cluster to the second cluster based upon the disaster recovery relationship, wherein the failover breaks the trust relationship; and
provide, by the second cluster during the failover, the client with remote access to data previously accessible to the client through the first cluster before the disaster, wherein the trust relationship is automatically migrated to create a migrated trust relationship, created in response to initiation of the failover triggered based upon detecting the disaster of the first cluster, for allowing mirroring of data from the second cluster to the different cluster.

18. The non-transitory machine readable medium of claim 17, wherein the instructions cause the machine to:
   detect that the first cluster recovered from the disaster; and
   perform a switchback from the second cluster to the first cluster, wherein the first cluster provides the clients with access to the data previously accessible to the clients through the second cluster during the failover.

19. The non-transitory machine readable medium of claim 17, wherein the instructions cause the machine to:
   establish a data protection relationship between the first cluster and the second cluster; and
   mirror data from the first cluster to the second cluster based upon the data protection relationship.

20. The non-transitory machine readable medium of claim 17, wherein the instructions cause the machine to:
   restrict the client from access to a replicated volume, the replicated volume storing the mirrored data, at the second cluster before establishment of the trust relationship.

* * * * *